United States Patent [19]
Cifuentes et al.

[11] Patent Number: 5,861,472
[45] Date of Patent: Jan. 19, 1999

[54] METHOD OF MAKING SILICONE PRESSURE SENSITIVE ADHESIVES

[75] Inventors: Martin Eric Cifuentes; William Neal Fenton; Bianxiao Zhong, all of Midland, Mich.

[73] Assignee: Dow Corning Corporation, Midland, Mich.

[21] Appl. No.: 684,844

[22] Filed: Jul. 5, 1996

[51] Int. Cl.$^6$ .................................................. C08F 283/12
[52] U.S. Cl. ............................. 525/477; 522/60; 522/62; 522/99; 522/148
[58] Field of Search ............................. 525/477; 522/60, 522/62, 99, 148

[56] References Cited

U.S. PATENT DOCUMENTS

| | | | |
|---|---|---|---|
| 2,676,182 | 9/1954 | Daudt et al. | 260/448.2 |
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,627,851 | 12/1971 | Brady | 260/825 |
| 3,772,247 | 11/1973 | Flannigan | 260/46.5 |
| 3,929,704 | 12/1975 | Horning | 260/29.1 |
| 4,831,070 | 5/1989 | McInally et al. | 524/267 |
| 4,865,920 | 9/1989 | Sweet | 428/447 |
| 5,100,976 | 3/1992 | Hamada et al. | 525/477 |
| 5,248,739 | 9/1993 | Schmidt et al. | 525/477 |
| 5,580,915 | 12/1996 | Lin | 524/267 |
| 5,602,214 | 2/1997 | Lin et al. | 525/478 |
| 5,726,256 | 3/1998 | Benson et al. | 525/477 |
| 5,776,614 | 7/1998 | Cifuentes et al. | 428/477 |

FOREIGN PATENT DOCUMENTS 0459292  5/1991  European Pat. Off. ....... C09J 183/04

*Primary Examiner*—Margaret W. Glass
*Attorney, Agent, or Firm*—Timothy J. Troy

[57] ABSTRACT

The present invention relates to a method of making silicone pressure sensitive adhesive compositions comprising the steps of heating a mixture of a polydiorganosiloxane, a silicone resin copolymer, and an equilibration catalyst, and then adding an organic peroxide or azo compound to the resultant reaction product. The silicone pressure sensitive adhesives prepared by the method of this invention are useful in preparing articles such as pressure sensitive tapes, labels, emblems and other decorative or informational signs.

22 Claims, No Drawings

METHOD OF MAKING SILICONE PRESSURE SENSITIVE ADHESIVES

BACKGROUND OF THE INVENTION

The present invention relates to a method of preparing silicone pressure sensitive adhesive compositions. More particularly the present invention relates to a method of making a silicone pressure sensitive adhesive composition comprising heating a mixture of a polydiorganosiloxane, a silicone resin copolymer, and an equilibration catalyst, and then adding an organic peroxide or azo compound to the resultant reaction product.

Silicone pressure sensitive adhesives (PSA's) are typically produced by either blending or condensing together a silicone resin and a silicone polymer. For example, Dexter et al. in U.S. Pat. No. 2,736,721 discloses a silicone pressure sensitive adhesive that is produced by mixing or condensing a silicone resin and a diorganopolysiloxane polymer having a viscosity of at least 1,000,000 centistokes.

Currie et al. in U.S. Pat. No. 2,814,601 discloses a silicone pressure sensitive adhesive that is produced by mixing together a silicone resin and a hydroxyl end-blocked diorganopolysiloxane fluid having a viscosity of from 5,000 to 1,000,000 centistokes. Currie et al. also discloses a permanent adhesive that is produced by adding a cross-linking agent and curing catalyst to the pressure sensitive adhesive composition.

Goodwin et al. in U.S. Pat. No. 2,857,356 discloses a silicone pressure sensitive adhesive that is produced by condensing together a silicone resin that is a cohydrolysis product of a trialkyl hydrolyzable silane and alkyl silicate with a linear organopolysiloxane fluid having a viscosity of greater than 200,000 centipoise.

Modic in U.S. Pat. No. 3,528,940 discloses compositions comprising the siloxane product of intercondensation at a temperature of from about 80° C. to 150° C. of a mixture of ingredients comprising parts of a silanol chain-stopped polydiorganosiloxane gum having a viscosity of at least about 10,000,000 centistokes at 25° C., a benzene-soluble resinous copolymer containing $R_3SiO_{0.5}$ units and $SiO_2$ units where R is a monovalent hydrocarbon radical, and a finely divided silica having a surface area in excess of about 100 square meters per gram.

Horning in U.S. Pat. No. 3,929,704 discloses a pressure sensitive adhesive composition comprising a silicone resin, a silicone gum, and a curing agent therefor, the curing agent comprising 2,4dichlorobenzoyl peroxide in admixture with a plasticizer and an extender therefor, the extender comprising an alkylarylsiloxane or an alkylaralkylsiloxane fluid.

McInally et al. in U.S. Pat. No. 4,831,070 discloses a composition for forming elastomeric pressure sensitive adhesives comprising a mixture of a resin copolymer containing triorganosiloxy units and $SiO_{4/2}$ units, a polydiorganosiloxane fluid endcapped with silicon-bonded hydroxy groups and having a viscosity of from about 50 to 300,000 centipoise at 25° C., an organosilicon compound containing an average of more than two silicon-bonded alkoxy groups per molecule, and a condensation catalyst such as metal salts of carboxylic acids.

Sweet in U.S. Pat. No. 4,865,920 discloses a hot-melt silicone pressure sensitive adhesive composition comprising a silicone resin, silicone fluid, and an ester having the formula RC(O)OR' where R is a monovalent hydrocarbon radical having from 2 to 32 carbon atoms, and R' is a monovalent hydrocarbon radical having from 1 to 14 carbon atoms.

European Patent Application No. 0459292 discloses a composition suitable for use as a pressure sensitive adhesive, comprising a homogenous mixture of 50 to 95 parts by weight of a first pressure sensitive adhesive composition comprising (I) a solid, benzene soluble resin copolymer containing $R_3SiO_{1/2}$ units and $SiO_{4/2}$ units where R is a monovalent hydrocarbon radical and (II) a hydroxyl end-blocked diorganopolysiloxane having a viscosity of about 100,000 to 500,000,000 centipoise at 25° C., and 5 to 50 parts by weight of a second pressure sensitive adhesive composition comprising a resin copolymer as described for (I) above, and a hydroxyl end-blocked diorganopolysiloxane as described for (II) above. The EP'292 reference further discloses that the above composition can be prepared by heating the mixture at a temperature of 130° C. in an organic solvent and in the presence of a base catalyst such as alkali metal hydroxides or aminofunctional silanes. The EP'292 reference further discloses that acids for neutralizing the condensed mixture include mineral acids such as hydrochloric acid or phosphoric acid, and organic acids such as acetic acid, or acetyl chloride. The EP'292 reference further discloses that, if desired, a catalyst may be employed to assist in the curing, examples of which include benzoyl peroxide, dichlorobenzoyl peroxide, and di-t-butyl peroxide.

Hamada et al. in U.S. Pat. No. 5,100,976 discloses a silicone pressure sensitive adhesive composition comprising a polydiorganosiloxane, an organopolysiloxane consisting essentially of $R_3SiO_{1/2}$ units and $(R^2O)_aSiO_{(4-a)/2}$ units where R is a monovalent hydrocarbon radical, and an organopolysiloxane consisting essentially of $R_3SiO_{1/2}$ units and $(R^2O)_aSiO_{(4-a)/2}$ units where R is as defined above in a molar ratio of 1:1 to 1:7. Hamada et al. further discloses that their compositions can further comprise a curing agent such as an organic peroxide.

U.S. Pat. No. 5,248,739 to Schmidt et al. discloses a silicone pressure sensitive adhesive that exhibits low adhesion to low energy substrates. The adhesive is produced by mixing together a silicone resin copolymer containing $R_3SiO_{1/2}$ units and $SiO_{4/2}$ units where R is a monovalent hydrocarbon radical and having a number average molecular weight of about 950 to 1,600 and a polydiorganosiloxane polymer. Schmidt et al. further discloses that these compositions can further comprise an organic peroxide as a crosslinking agent when the polydiorganosiloxane polymer does not contain unsaturated groups.

However, nowhere does Schmidt et al. disclose a method of making silicone pressure sensitive adhesives whereby a mixture of a polydiorganosiloxane, a silicone resin, and an equilibration catalyst are first heated to form a reaction product, and then an organic peroxide or azo compound is added to the reaction product. Schmidt et al. also do not disclose that a higher molecular weight resin can be employed is such a method.

SUMMARY OF THE INVENTION

The present invention relates to a method of preparing silicone pressure sensitive adhesive compositions comprising heating a mixture of a polydiorganosiloxane, a silicone resin copolymer, and an equilibration catalyst, and thereafter adding an organic peroxide or azo compound.

It is an object of the present invention to provide a silicone pressure sensitive adhesive that exhibits high tack while retaining good peel adhesion and cohesive strength in a peroxide cured system.

It is further an object of the present invention to provide a silicone pressure sensitive adhesive that is produced by equilibrating a polydiorganosiloxane in the presence of a silicone resin.

It is further an object of this invention to provide a silicone pressure sensitive adhesive having a high solids content which maintains excellent adhesive properties at low viscosities.

It is another object of this invention to provide a silicone pressure sensitive adhesive which will be particularly suitable in adhesive tape constructions.

DETAILED DESCRIPTION OF THE INVENTION

The present invention relates to a method of making a silicone pressure sensitive adhesive composition comprising the steps of (I) heating a mixture comprising (A) a hydroxyl-terminated polydiorganosiloxane having a viscosity of from 100 to 10,000,000 mm$^2$/s at 25° C. or a mixture of a hydroxyl-terminated polydiorganosiloxane and a polydiorganosiloxane selected from polydiorganosiloxanes terminated with monovalent hydrocarbon radicals free of aliphatic unsaturation or alkenyl-terminated polydiorganosiloxanes wherein said mixture has a viscosity of from 100 to 10,000,000 mm$^2$/s at 25° C., (B) a soluble silicone resin comprising $R_3SiO_{1/2}$ siloxane units and $SiO_{4/2}$ units having a number average molecular weight of 3000 to 7500, wherein R is selected from a monovalent hydrocarbon or halohydrocarbon radical having from 1 to 20 carbon atoms and free of aliphatic unsaturation, an alkenyl radical, or a hydroxyl radical, and (C) an equilibration catalyst selected from alkali metal oxides, alkali metal alkoxides, alkali metal hydroxides, alkali metal silanolates, alkali metal siloxanolates, alkali metal amides, or alkyl metals to form a reaction product having a solids content of at least 80% and a viscosity of up to 200,000 millipascal-seconds, and (II) adding (D) an organic peroxide or azo compound to the reaction product of (I).

The hydroxyl-terminated polydiorganosiloxane of component (A) is preferably a polydiorganosiloxane having the general formula $HOR^1_2SiO(R^1_2SiO)_aSiR^1_2OH$ wherein each $R^1$ is independently selected from a monovalent hydrocarbon or halohydrocarbon radical having from 1 to 20 carbon atoms or an alkenyl radical. The monovalent hydrocarbon radicals free of aliphatic unsaturation include alkyl radicals such as methyl, ethyl, propyl, pentyl, octyl, undecyl or octadecyl, cycloaliphatic radicals such as cyclohexyl, aryl radicals such as phenyl, tolyl, xylyl, benzyl or 2-phenylethyl, and chlorinated hydrocarbon radicals such as 3-chloropropyl and dichlorophenyl. The alkenyl radicals include vinyl, allyl, butenyl, hexenyl, cyclohexenyl and beta-cyclohexenylethyl. Preferably $R^1$ is selected from methyl, phenyl, or vinyl. Preferably the hydroxyl-terminated polydiorganosiloxane of component (A) is a compound in which at least 50%, and preferably at least 85%, of the $R^1$ radicals are methyl radicals.

The average value of subscript "a" above is such that it provides a viscosity at 25° C. of about 100 mm$^2$/s (100 centistokes) to about 10,000,000 mm$^2$/s (1,000,000 centistokes), the viscosity being a function of the $R^1$ radicals on the polymer. It is especially preferred that the average value of a is such that it provides an organopolysiloxane component (A) having a viscosity in the range of 100 to 1,000,000 at 25° C., and it is highly preferred that a has a value such that the viscosity of component (A) ranges from 1,000 to 500,000 mm$^2$/s when measured at 25° C.

Specific examples of these polydiorganosiloxanes include, but are not limited to, $HOMe_2SiO(Me_2SiO)_a SiMe_2OH$, $HOMe_2SiO(Me_2SiO)_{0.94a}$ $(Ph_2SiO)_{0.06a}SiMe_2OH$, $HOPh_2SiO(Me_2SiO)_{0.94a}$ $(Ph_2SiO)_{0.06a}SiPh_2OH$, $HOMe_2SiO(Me_2SiO)_{0.95a}$ $(MeViSiO)_{0.05a}SiMe_2OH$, $HOVi_2SiO(Me_2SiO)_{0.95a}$ $(MeViSiO)_{0.05a}SiVi_2OH$, or $HOR_2SiO(Me_2SiO)_{0.88a}$ $(Ph_2SiO)_{0.12a}SiR_2OH$ wherein R and a are as defined above.

Component (A) can also be a mixture of a hydroxyl-terminated polydiorganosiloxane and a polydiorganosiloxane selected from polydiorganosiloxanes terminated with monovalent hydrocarbon radicals free of aliphatic unsaturation or alkenyl- terminated polydiorganosiloxanes wherein said mixture has a viscosity of from 100 to 10,000,000 mm$^{2/s}$ at 25° C. The hydroxyl-terminated polydiorganosiloxane is as described above including preferred embodiments thereof. The monovalent hydrocarbon radicals free of aliphatic unsaturation and the alkenyl radicals are as described above including preferred embodiments thereof.

Specific examples of polydiorganosiloxanes terminated with monovalent hydrocarbon radicals free of aliphatic unsaturation include, but are not limited to, $Me_3SiO(Me_2SiO)_aSiMe_3$, $Me_3SiO(Me_2SiO)_{0.95a}(MeViSiO)_{0.05a}SiMe_3$, or $Me_3SiO(Me_2SiO)_{0.5a}(MePhSiO)_{0.5a}SiMe_3$ wherein Me, Vi, and Ph denote methyl, vinyl and phenyl, respectively, and a has an average value as defined above.

Specific examples of polydiorganosiloxanes terminated with alkenyl radicals include, but are not limited to, $ViMe_2SiO(Me_2SiO)_aSiMe_2Vi$, $ViMe_2SiO(Me_2SiO)_{0.95a}(MePhSiO)_{0.05a}SiMe_2Vi$, $ViMe_2SiO(Me_2SiO)_{0.98a}(MeViSiO)_{0.02a}SiMe_2Vi$, $PhMeViSiO(Me_2SiO)_aSiPhMeVi$, or $PhMeViSiO(Me_2SiO)_{0.8a}(MePhSiO)_{0.1a}(Ph_2SiO)_{0.1a}SiPhMeVi$, wherein Me, Vi, and Ph denote methyl, vinyl and phenyl, respectively, and a has an average value as defined above.

In component (A) it is also preferred that the sum of phenyl and vinyl radicals should not exceed 30% of the silicon atoms. In addition, component (A) can comprise trace amounts of siloxane branching sites, such as $R^2SiO_{3/2}$ units and $SiO_{4/2}$ units, provided that the component remains flowable. Component (A) is well known in the art and can be prepared by known methods.

The amount of component (A) in the compositions of this invention is preferably from about 30 parts by weight to about 50 parts by weight, and more preferably from about 38 parts by weight to about 47 parts by weight per 100 parts by weight of components (A)+(B).

Component (B) of the instant invention is a soluble silicone resin comprising $R_3SiO_{1/2}$ siloxane units (M units) and $SiO_{4/2}$ siloxane units (Q units), wherein R is selected from a monovalent hydrocarbon or halohydrocarbon radical having 1 to 20 carbon atoms and free of aliphatic unsaturation, an alkenyl radical, or a hydroxyl radical, all of which are as defined above. By the term "soluble" it is meant that the silicone resin (B) can be dispersed, substantially completely, in either a hydrocarbon liquid such as benzene, toluene, xylene, heptane and the like or in a silicone liquid such as cyclic or linear polydiorganosiloxanes. Preferably the resin is soluble in component (A), delineated hereinabove. Preferably the silicone resin of component (B) is a soluble hydroxy-functional organopolysiloxane resin consisting of M units and Q units. In the hydroxyl functional organopolysiloxane resin the $R_3SiO_{1/2}$ siloxane units are bonded to the $SiO_{4/2}$ units each of which is bonded to at least one other $SiO_{4/2}$ unit. Some of the $SiO_{4/2}$ units are bonded to hydroxy radicals resulting in $HOSiO_{3/2}$ units, thereby accounting for the silicon-bonded hydroxyl content of the resin. In addition, the resin may contain a small amount of a low molecular weight material comprised substantially of a neopentamer organopolysiloxane having the formula $(R^3_3SiO)_4Si$.

It is preferable that the hydroxy-content of the silicone resin as determined by $^{29}$Si NMR (nuclear magnetic resonance) ranges from 1.0 wt % to 5.0 wt % based on the resin solids content, and preferably 1.5 wt % to 3.5 wt %. Although resins having less than 1.0 wt % hydroxy can be used in the instant invention, such resins are less favorable since the triorganosilyl groups would have to be cleaved and the hydroxy introduced during the reaction to produce the silicone pressure sensitive adhesive.

In the formula for organopolysiloxane resin (B), R is as defined above, including preferred embodiments thereof. Preferably R is selected from methyl, phenyl, vinyl, or hydroxyl. Preferably, at least one-third, and more preferably substantially all R radicals in the formula for component (B) are methyl radicals. Examples of preferred $R_3SiO_{1/2}$ siloxane units include $Me_3SiO_{1/2}$, $ViMe_2SiO_{1/2}$, $PhMe_2SiO_{1/2}$ and $Ph_2MeSiO_{1/2}$ where Me denotes methyl, Ph denotes phenyl, and Vi denotes vinyl.

It is preferred that the molar ratio of $R_3SiO_{1/2}$ siloxane units to $SiO_{4/2}$ units is 0.6 to 1.2. It is more preferred that the mole ratio of the total $R_3SiO_{1/2}$ siloxane units to $SiO_{4/2}$ units be between 0.6 and 1.0. The above M/Q mole ratios can be easily obtained by $^{29}$Si NMR. Component (B) has a number average molecular weight (Mn) of about 3,000 to 7,500 when measured by gel permeation chromatography (GPC) against a polydimethylsiloxane standard. It is especially preferred that the molecular weight of Component (B) is from 3,500 to 6,000.

Component (B) can be prepared by well known methods. It is preferably prepared by the silica hydrosol capping process of U.S. Pat. No. 2,676,182 to Daudt et al., as modified by U.S. Pat. No. 3,627,851 to Brady, and U.S. Pat No. 3,772,247 to Flannigan, each patent being incorporated herein by reference to teach how to prepare soluble organopolysiloxanes which are useful in the instant invention. Further, component (B) can be prepared by the cohydrolysis of a trialkyl hydrolyzable silane and alkyl silicate as described in U.S. Pat. No. 2,857,356, to Goodwin herein incorporated by reference for its teaching of how to prepare the resin.

The amount of component (B) in the method of this invention is preferably from about 50 parts by weight to about 70 parts by weight, and more preferably from about 53 parts by weight to about 62 parts by weight per 100 parts by weight of components (A)+(B).

Component (C) in the method of this invention is an equilibration catalyst selected from alkali metal oxides, alkali metal alkoxides, alkali metal hydroxides, alkali metal silanolates, alkali metal siloxanolates, alkali metal amides, or alkyl metals. Alkali metal oxides suitable as component (C) are exemplified by sodium oxide, alkali metal alkoxides are exemplified by potassium ethoxide, sodium methoxide, lithium methoxide, and potassium isopropoxide, alkali metal hydroxides are exemplified by potassium hydroxide, lithium hydroxide, sodium hydroxide, cesium hydroxide, tetramethyl ammonium hydroxide, and tetrabutyl phosphonium hydroxide, alkali metal silanolates are exemplified by potassium silanolate, lithium silanolate, and sodium silanolate, alkali metal siloxanolates are exemplified by potassium siloxanolate, lithium siloxanolate, and sodium siloxanolate, alkali metal amides are exemplified by sodium amide and potassium amide, and alkyl metals are exemplified by butyllithium.

The amount of component (C) in the method of this invention is preferably from about 10 to about 500, and more preferably from about 20 to about 200 parts per million (ppm), based on the total weight of components (A)+(B).

The reaction product of step (I) is made by heating a mixture of components (A), (B), and (C) at a temperature of above 100° C. The mixing of these components can be enhanced, if desired, by the use of one or more solvents in the mixture of step (I), such as benzene, toluene, xylene, alcohols such as methanol, ethanol, isopropanol, butanol, or n-propanol, naphtha, or mineral spirits. The amount of solvent, if used, ranges from about 10 to 80 parts by weight per 100 parts by weight of components (A)+(B). The solvent can then be removed, if desired, during the heating of the mixture. The mixture of (A)–(C) is generally heated for up to 4 hours at temperatures of from 150° to 180° C., however, the time and temperature are dependent on the selection and concentration of the reaction components.

When a solvent is used, it may be desirable to strip off the solvent after the formation of the reaction product. Methods of stripping volatile components are well known in the art and need no extensive delineation herein. Any method of removing volatile components can be used, such methods exemplified by molecular stills, rotoevaporators, and wipe film evaporators, with the preferred method being rotoevaporators.

The mixture of step (I) can also further comprise a rare earth metal salt of a fatty acid. Examples of rare earth metals suitable for forming the salt include cerium, lanthanum, praseodymium, with cerium being preferred. The fatty acid generally contains about 6 to 18 carbon atoms, most preferably about 8 carbon atoms. The preferred rare earth metal salt is cerium octoate. The rare earth metal salt is generally used in the method of this invention to provide the composition produced with an amount of rare earth metal within the range of from about 1 to about 1000 parts by weight, and preferably from about 10 to about 250 parts by weight per one million parts by weight of components (A)+(B). Typically, the rare earth metal salt if used is in the form of a 30% solution, 6% of which is composed of the active rare earth metal. Solvents suitable for the rare earth metal solution include hexane, heptane, toluene, xylene, naphtha, mineral spirits, or ketones.

The reaction product of step (I) must have a solids content of at least 80% and a viscosity of up to 200,000 millipascal-seconds (mPa.s). It is even more preferred that the reaction product of step (I) have a solids content of at least 80% and a viscosity of up to 150,000 mPa.s, and it is highly preferred that the reaction product of step (I) have a solids content of at least 80% and a viscosity of up to 100,000 mPa.s.

In step (II), component (D), an organic peroxide or azo compound is added to the reaction product of step (I). Examples of organic peroxides which are suitable as component (D) include diacyl peroxides such as benzoyl peroxide or dichlorobenzoyl peroxide. Benzoyl peroxide has been found to be a particularly effective organic peroxide.

Examples of azo compounds suitable as component (D) include azobenzene, azobenzene-p-sulfonic acid, azobisdimethylvaleronitrile, azobisisobutyronitrile, or azodine, with azobisisobutyronitrile being preferred. Component (D) when added to the product of step (I) can be added as a solution, for example, in an appropriate solvent such as benzene, toluene, xylene, naphtha, chlorocarbons, or mineral spirits.

The amount of Component (D) in the method of this invention is preferably from about 0.1 to 5 parts by weight, and more preferably from about 1.5 to 3.5 parts by weight per 100 parts by weight of components (A)+(B).

During or after the formation of the silicone pressure sensitive adhesive composition, small amounts of additional ingredients may be added to the composition so long as they do not materially affect the pressure sensitive adhesive composition. These additional ingredients may be exemplified by, but not limited to, antioxidants, pigments, stabilizers, fillers, and others. It should be apparent to one skilled in the art that a blend of two reaction products, each having different amounts of components (A), (B), and/or (C), can be formed in Step (I), and then this blend can be catalyzed according to Step (II).

The silicone pressure sensitive adhesives prepared by the method of this invention are useful as pressure sensitive adhesives and will readily stick to support a solid support, whether flexible or rigid. These compositions may be applied to a surface by any suitable means such as rolling, spreading, spraying, etc., and cured as described above.

The surface of the support and the substrate to which the support is adhered may be any known solid material such as metals, such as aluminum, silver, copper, iron and their alloys, porous materials such as paper, wood, leather, and fabrics, organic polymeric materials such as polyolefins including polyethylene and polypropylene, fluorocarbon polymers such as polytetrafluoroethylene and polyvinylfluoride, silicone elastomers, silicone resins, polystyrene, polyamides such as Nylon, polyimides, polyesters and acrylic polymers, painted surfaces, siliceous materials such as concrete, bricks, cinderblocks, and glass such as glass cloth. Porous materials such as glass cloth are often impregnated with a substance that will prevent the migration of the silicone pressure sensitive adhesive from one surface to another surface of the support. In this regard, it is also well known to chemically treat, physically treat (for example etching, etc.), or primecoat (adding a curable polysiloxane) the surface of a substrate prior to addition of the silicone PSA to enhance the adhesion of the silicone pressure sensitive adhesive to said surface. The PSA's of the invention are particularly suited to applications wherein good adhesion to a low energy surface (e.g., polyethylene or Teflon™) is desired.

The amount of silicone pressure sensitive adhesive composition to be applied to the surfaces should be sufficient to render the surface definitely tacky to the touch after the removal of any solvent. After applying it to the surface, the adhesive may be cured by air drying or heating at temperatures of up to 300° C.

Solid supports bearing the cured compositions of this invention are readily adhered to any solid substrate because the silicone pressure sensitive adhesive compositions prepared by the method of this invention have high tack and good adhesive strength.

Useful articles which can be prepared with the silicone pressure sensitive adhesives of this invention include pressure sensitive tapes, labels, emblems and other decorative or informational signs, among others. In particular, the silicone pressure sensitive adhesives are useful in tapes such as a splicing tape in label and paper stock manufacture and converting. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

All parts and percentages are on a weight basis and all measurements were obtained at 25° C. unless otherwise indicated. The molecular weight properties of the polydimethylsiloxane polymers below were determined by Gas Phase Chromatography (GPC) in a toluene solvent, and using a polydimethylsiloxane standard.

The apparatus and testing procedures used for the results shown herein are as follows:

Adhesion was measured by applying a 6×1 inch strip of a Kapton™-or Mylar™-backed adhesive to a clean 2×6 inch stainless steel, polyethylene (PE) or Teflon™ panel using two passes of a 4.5 lb. rubber-coated roller. The force required to remove the tape from the panel was measured with a Keil Tester at an peel angle of 180° C. at a rate of 12 inches per minute. The values recorded are the average of multiple readings taken during the course of one pull per sample. The Keil Tester is described in TAPPI, vol. 43, No. 8. pages 164A and 165A (August 1960). The readings are reported in units of ounces per inch (oz/in).

Tack was measured on five one-inch squares of the Kapton™ or Mylar™-backed adhesive using a POLYKEN (R) probe tack tester, available from Testing Machines, Inc., Amityville, N.Y. The tack tester has a 0.5 cm diameter stainless steel probe. The test procedure used a 20 gram weight, a dwell time of 1.0 seconds and a pull speed of 0.5 cm per second. The results reported represent the average of at least five readings, expressed in grams.

The cohesive strength of the compositions was measured by devolatilizing non-catalyzed, 2 gram samples of the adhesive at 150° C. for one hour in an aluminum foil container, and then physically tearing the container and the cured film apart. The container halves are then pulled apart. If the film stretches across the torn cup, with rubber-like elongation, the cohesive strength is recorded as "Pass". If the film tears along with the cup and exhibits very little elongation the result is recorded as "Fail".

The high temperature hold was measured by preparing triplicate samples according to the following procedure: To begin, one inch wide strips of 2 mil PSA films, supported on a 1 mil Kapton(R) backing, are applied to a clean, polished, stainless steel panel, in such a way as to provide a 1 square inch area of contact between the adhesive tape and the substrate. Contact is maximized by making two passes across the bonded area using a 4.5 lb. roller. The steel panel and attached adhesive tape are then vertically mounted, and a 1000 gram weight is attached to the bottom of the adhesive strip. The mounted samples are then placed in a 400° F. oven, and are allowed to remain there for a period of five days, or until at least two out of the three samples have detached from the steel panel.

Non-volatile content, i.e. percent solids, of an adhesive material was determined by heating a two gram sample of the material at 150° C. for one hour and expressing the weight of the residue as a percentage of the original sample weight.

The non-volatile content of the MQ resins was determined by mixing about 1.5 grams of resin solution with about 0.75 grams of a polydimethylsiloxane fluid having a viscosity of 100 centistokes (cS) (100 mm$^2$/ s), followed by devolatilization at 150° C. for 2 hours.

Molecular weights of the soluble silicone resins were measured by gel-permeation chromatography (GPC) using Varian TSK 4000+2500 columns at 35° C. in a toluene mobile phase at 1 ml/min. Polydimethylsiloxane (PDMS) standards were used for linear regression calibrations. A refractive index detector was used in the GPC measurements employing the PDMS standard calibration.

The resins in the examples were analyzed using $^{29}$Si n.m.r. to determine the molar ratios of the $(CH_3)_3SiO_{1/2}$ units (M) to $SiO_{4/2}$ units (Q) in each resin and to determine the hydroxyl content of each resin.

Viscosities were measured in centipoise (cP) (1 cP =1 millipascal-second (mPa.s)) at room temperature (25°+/-2° C.) using a Brookfield rotating disc viscometer fitted with an LV-4 spindle. The following materials were employed in preparing the compositions in the examples:

POLYMER A was a hydroxyl-endblocked polydimethylsiloxane fluid having a viscosity of about 330,000 mPa.s, a number average molecular weight (Mn) of 90,310, and a weight average molecular weight (MW) of 174,700.

POLYMER B was a hydroxyl-endblocked polydimethylsiloxane fluid having a viscosity of about 55,000 mPa.s, an Mn of 52,910, and an Mw of 101,200.

POLYMER C was a hydroxyl-endblocked polydimethylsiloxane fluid having a viscosity of about 15,000 mPa.s, an Mn of 38,200, and an Mw of 68,470.

POLYMER D was a hydroxyl-endblocked polydimethylsiloxane gum copolymer containing 4 mole % MeViSiO repeat units and having a plasticity of about 59 mils as measured by ASTM D926-27.

RESIN A was a benzene-soluble, siloxane resin consisting of $(CH_3)_3SiO_{1/2}$ (M) units and $SiO_{4/2}$ (Q) units and having an M/Q ratio of 0.78/1.0, a hydroxyl content of 2.9 wt %, and the following molecular weight characteristics as determined by GPC in Chloroform, using fractionated MQ resin standards and an IR detector, an Mn of 4,300, an Mw of 14,600, and an Mw/Mn of 3.395.

THERMAL STABILITY ADDITIVE was Ten-Cem™ (a dispersion of a neodecanoate salt of a rare earth metal in mineral spirits having 6% active metals in the mineral spirits from Mooney Chemicals, Inc., Cleveland, Ohio).

PEROXIDES:

Perkadox(R) PD-50S-ps-a—a 50 wt % 2,4-dichlorobenzoyl peroxide supplied in a proprietary polysiloxane fluid by Akzo Chemical.

Benzoyl Peroxide, in granular form, was 98% pure supplied by Aldrich Chemical Company.

POTASSIUM SILANOLATE SOLUTION: a 10 wt% solids solution of potassium silanolate in toluene.

COMPARATIVE EXAMPLE 1

About 148.8 grams (gm) of Resin A, 74.2 gm of Polymer A, 77.0 gm of toluene, and 0.06 gm of a thermal stability additive were combined and thoroughly blended in a 500 milliliter (ml), three-necked flask equipped with a stirrer, thermometer, condenser, and Dean Stark Trap. The mixture was heated to reflux and maintained at reflux for approximately 2 hours (hrs). The resultant product was then stripped at atmospheric pressure to a desired non-volatiles content in the range of 75% solids. The viscosity of the resultant PSA was determined to be approximately 4,000 mPa.s at 75% solids.

The resultant pressure sensitive adhesive composition (PSA) was then tested for cohesive strength as described above and failed thus showing that the cohesive strength of the pressure sensitive adhesive was poor.

COMPARATIVE EXAMPLE 2

About 148.8 gm of Resin A, 74.2 gm of polymer A, 77.0 gm of toluene, and 0.06 gm of a thermal stability additive were combined and thoroughly blended in a 500 ml, three-necked flask equipped with a stirrer, thermometer, condenser, and Dean Stark Trap. The resultant blend was then stripped at atmospheric pressure to a desired non-volatiles content in the range of 75% solids. The viscosity of the resultant PSA was determined to be approximately 4,600 mPa.s at 75% solids.

The resultant pressure sensitive adhesive composition (PSA) was then tested for cohesive strength as described above and failed thus showing that the cohesive strength of the pressure sensitive adhesive was poor.

EXAMPLE 1

Approximately 146.3 gm of Resin A, 76.8 gm of polymer B, 77.0 gm of toluene, 0.06 gm of a thermal stability additive, and 2.7 gm of a potassium silanolate solution were combined and thoroughly blended in a three-necked flask equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The resultant high solids product was then recovered and stored for later use. The final product was determined to be approximately 33,750 mPa.s at 84.8% solids.

EXAMPLE 2

Approximately 146.3 gm of Resin B, 76.8 gm of polymer B, 77 gm of toluene, 0.06 gm of a thermal stability additive, and 5.4 gm of a potassium silanolate solution were combined and thoroughly blended in a three-necked flask equipped with a stirrer, thermometer, condenser, and Dean Stark Trap. The mixture was heated to reflux and maintained at reflux for approximately 4 hrs. Water was continuously removed during the reflux step. The resultant mixture was then neutralized with 0.99 gm of a proprietary blend of phosphoric acid and silicone fluids and stripped at atmospheric pressure to a desired non-volatiles content in the range of 85% solids. The resultant PSA was then recovered and measured to be 11,300 mPa.s at 83.1% solids.

EXAMPLE 3

Approximately 146.3 gm of Resin A, 76.4 gm of polymer C, 77.4 gm of toluene, 0.06 gm of a thermal stability additive, and 0.72 gm of 0.05N KOH in ethanol were combined and thoroughly blended in a 500 ml, three-necked flask equipped with a stirrer, thermometer, condenser, and Dean stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 3,500 mPa.s at 85.7% solids.

EXAMPLE 4

Approximately 146.3 gm of Resin A, 76.4 gm of polymer C, 77.4 gm of toluene, 0.06 gm of a thermal stability additive, and 1.44 gm of 0.05N KOH in ethanol were combined and thoroughly blended in a 500 ml, three-necked flask equipped with a stirrer, thermometer, condenser, and Dean stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 13,400 mPa.s at 85.2% solids.

EXAMPLE 5

Approximately 146.3 gin of Resin A, 76.4 gm of polymer C, 77.4 gm of toluene, 0.06 gm of a thermal stability additive, and 2.88 gm of 0.05N KOH in ethanol were combined and thoroughly blended in a three-necked flack equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 15,200 mPa.s at 84.3% solids.

EXAMPLE 6

Portions of the PSA samples described in examples 1, 2, 3, 4, and 5, were catalyzed with benzoyl peroxide at a 2% level of peroxide solids based on PSA solids content in the adhesive sample. The peroxide was incorporated into the PSA as a 10% solution in toluene. The adhesive solution was then cast onto 1 mil Kapton(R) film at a thickness sufficient to yield a 2 mil cured PSA film. The cast PSA films were devolatilized for 2 minutes at 70° C., and then cured for 2 additional minutes at 204° C. The resultant sheets supporting the PSA coatings were then cut into 1" wide strips and tested for 180 Peel Adhesion and Polyken(R) Probe Tack as described above. Results are provided in Table 1 below.

TABLE 1

| PSA SAMPLE | 180° PEEL ADHESION | PROBE TACK |
| --- | --- | --- |
| Ex. 1 | 26 oz/in | 837 gm/cm$^2$ |
| Ex. 2 | 25 oz/in | 755 gm/cm$^2$ |
| Ex. 3 | 27 oz/in | 887 gm/cm$^2$ |
| Ex. 4 | 24 oz/in | 855 gm/cm$^2$ |
| Ex. 5 | 26 oz/in | 887 gm/cm$^2$ |

Approximately 146.3 gm of Resin A, 70.3 gm of polymer C, 6.6 gm of Polymer D, 77.4 gm of toluene, 0.06 gm of a thermal stability additive, and 1.44 gm of 0.05N KOH in ethanol were combined and thoroughly blended in a 500 ml three-necked flask equipped with a stirrer, thermometer, condenser, and Dean Stark Trap. The mixture was heated to reflux and maintained at reflux for approximately 4 hrs. Water was continuously removed during the reflux step. The resultant product was then stripped at atmospheric pressure to a desired non-volatiles content in the range of 85% solids. The viscosity of the resultant PSA product was determined to be 20,000 mPa.s at 84.4% solids.

A portion of the PSA sample described above was catalyzed with benzoyl peroxide at a 2% level of peroxide solids based on PSA solids content in the adhesive sample. The peroxide was incorporated into the PSA as a 10% solution in toluene. The adhesive solution was then cast onto 1 mil Kapton(R) film at a thickness sufficient to yield a 2 mil cured PSA film. The cast PSA film was devolatilized for 2 minutes at 70° C., and then cured for 2 additional minutes at 204° C. The resultant laminated sheet was then cut into 1 wide strips and tested for 180 Peel Adhesion and Polyken(R) Probe Tack as described above. The peel adhesion of the film was 24 oz/in and the probe tack was 735 gm/cm$^2$.

What is claimed is:

1. A method of making a silicone pressure sensitive adhesive composition comprising the steps of:
   (I) heating a mixture comprising:
   (A) (i) a hydroxyl-terminated polydiorganosiloxane having a viscosity of from 100 to 10,000,000 nm$^2$/s at 25° C. or
   (ii) a mixture of (a) a hydroxyl-terminated polydiorganosiloxane and (b) a polydiorganosiloxane selected from (i) polydiorganosiloxanes terminated with monovalent hydrocarbon radicals free of aliphatic unsaturation or (ii) alkenyl-terminated polydiorganosiloxanes wherein said mixture has a viscosity of from 100 to 10,000,000 mm$^2$/s at 25° C.;
   (B) a soluble silicone resin comprising R$_3$SiO$_{1/2}$ siloxane units and SiO$_{4/2}$ units having a number average molecular weight of 3000 to 7500, wherein R is selected from a monovalent hydrocarbon or halohydrocarbon radical having from 1 to 20 carbon atoms, an alkenyl radical, or a hydroxyl radical; and
   (C) an equilibration catalyst selected from alkali metal oxides, alkali metal alkoxides, alkali metal hydroxides, alkali metal silanolates, alkali metal siloxanolates, alkali metal amides, or alkyl metals to form a reaction product having a solids content of at least 80% and a viscosity of up to 200,000 millipascal-seconds; and
   (II) adding (D) an organic peroxide or azo compound to the reaction product of (I).

2. A method according to claim 1, wherein the hydroxyl-terminated polydiorganosiloxane is a polydiorganosiloxane having the general formula

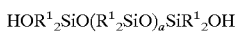

wherein each R$^1$ is independently selected from a monovalent hydrocarbon or halohydrocarbon radical having from 1 to 20 carbon atoms or an alkenyl radical and a has a value such that the viscosity of the polydiorganosiloxane ranges from 1,000 to 500,000 mm$^2$/s when measured at 25° C.

3. A method according to claim 2, wherein R$^1$ is selected from methyl, phenyl, or vinyl.

4. A method according to claim 1, wherein the hydroxyl-terminated polydiorganosiloxane is selected from a polydiorganosiloxane having its formula selected from HOMe$_2$SiO(Me$_2$SiO)$_a$SiMe$_2$OH, HOMe$_2$SIO(Me$_2$SiO)$_{0.94a}$(Ph$_2$SiO)$_{0.06a}$SiMe$_2$OH, HOPh$_2$SiO(Me$_2$SiO)$_{0.94a}$(Ph$_2$SiO)$_{0.06a}$SiPh$_2$OH, HoMe$_2$SiO(Me$_2$SiO)$_{0.95a}$(MeViSiO)$_{0.05a}$SiMe$_2$OH, HOVi$_2$SiO(Me$_2$SiO)$_{0.95a}$(MeViSiO)$_{0.05a}$SiVi$_2$OH, or HOR$_2$SiO(Me$_2$SiO)$_{0.88a}$(Ph$_2$SiO)$_{0.12a}$SiR$_2$OH wherein each R is independently selected from methyl, phenyl, or vinyl, and a has a value such that the viscosity of the polydiorganosiloxane ranges from 1,000 to 500,000 mm$^2$/s when measured at 25° C.

5. A method according to claim 1, wherein the monovalent hydrocarbon radicals free of aliphatic unsaturation are selected from methyl or phenyl.

6. A method according to claim 1, wherein the alkenyl radical is vinyl.

7. A method according to claim 1, wherein (b)(i) is selected from Me$_3$SiO(Me$_2$SiO)$_a$SiMe$_3$, Me$_3$SiO(Me$_2$SiO)$_{0.95a}$(MeViSiO)$_{0.05a}$SiMe$_3$, or Me$_3$SiO(Me$_2$SiO)$_{0.05a}$(MePhSiO)$_{0.5a}$SiMe$_3$ wherein Me, Vi, and Ph denote methyl, vinyl and phenyl, respectively, and a has a value such that the viscosity of the polydiorganosiloxane ranges from 1,000 to 500,000 mm$^2$/s when measured at 25° C.

8. A method according to claim 1, wherein (b)(ii) is selected from ViMe$_2$SiO(Me$_2$SiO)$_a$SiMe$_2$Vi, ViMe$_2$SiO(Me$_2$SiO)$_{0.95a}$(MePhSiO)$_{0.05a}$SiMe$_2$Vi, ViMe$_2$SiO(Me$_2$SiO)0.$_{98}$a(MeViSiO)0.$_{02}$aSiMe$_2$Vi PhMeViSiO(Me$_2$SiO)$_a$SiPhMeVi, or PhMeViSiO(Me$_2$SiO)$_{0.8a}$(MePhSiO)$_{0.1a}$(Ph$_2$SiO)$_{0.1a}$SiPhMeVi, wherein Me, Vi, and Ph denote methyl, vinyl and phenyl, respectively, and a has a value such that the viscosity of the polydiorganosiloxane ranges from 1,000 to 500,000 mm$^2$/s when measured at 25° C.

9. A method according to claim 1, wherein R is selected from methyl, phenyl, vinyl, or hydroxyl.

10. A method according to claim 1, wherein the molar ratio of $R_3SiO_{1/2}$ units to $SiO_{4/2}$ units is from 0.5 to 1.3.

11. A method according to claim 1, wherein (B) has a number average molecular weight of 3,500 to 6,000.

12. A method according to claim 1, wherein (C) is selected from alkali metal hydroxides, alkali metal silanolates, or alkali metal siloxanolates.

13. A method according to claim 1, wherein (C) is selected from sodium oxide, potassium ethoxide, sodium methoxide, lithium methoxide, potassium isopropoxide, potassium hydroxide, lithium hydroxide, sodium hydroxide, cesium hydroxide, tetramethyl ammonium hydroxide, tetrabutyl phosphonium hydroxide, potassium silanolate, lithium silanolate, sodium silanolate, potassium siloxanolate, lithium siloxanolate, sodium siloxanolate, sodium amide, potassium amide, or butyllithium.

14. A method according to claim 13, wherein (C) is selected from potassium silanolate, potassium siloxanolate, sodium hydroxide, or potassium hydroxide.

15. A method according to claim 1, wherein the mixture of step (I) further comprises a solvent.

16. A method according to claim 15, wherein the solvent is selected from benzene, toluene, xylene, alcohols, naphtha, or mineral spirits.

17. A method according to claim 1, wherein the mixture of step (I) further comprises a rare earth metal salt of a fatty acid.

18. A method according to claim 15, wherein the mixture of step (I) further comprises a rare earth metal salt of a fatty acid.

19. A method according to claim 15, wherein the stripping the reaction product of step (I) prior to step (II).

20. A method according to claim 1, wherein (D) is selected from benzoyl peroxide, dichlorobenzoyl peroxide, or azobisisobutyronitrile.

21. A method according to claim 1, wherein the reaction product of step (I) has a solids content of at least 80% and a viscosity of up to 150,000 millipascal-seconds.

22. A method according to claim 1, wherein the reaction product of step (I) has a solids content of at least 80% and a viscosity of up to 100,000 millipascal-seconds.

* * * * *